J. W. TYSON
Wheel Cultivator.

No. 62,511. Patented Feb. 26, 1867.

Witnesses:
P. T. Dodge
Capt. R. H. Emerson

Inventor:
J. W. Tyson
By W. C. Dodge
Attorney

United States Patent Office.

J. W. TYSON, OF LOWER PROVIDENCE, PENNSYLVANIA.

Letters Patent No. 62,511, dated February 26, 1867.

IMPROVEMENT IN CULTIVATORS.

The Schedule referred to in these Letters Patent and making part of the same.

My invention consists in certain Improvements on the Cultivator patented to me on the 14th day of August, 1866, said improvement relating to the means for adjusting and regulating the position of the ploughs.

Figure 1:
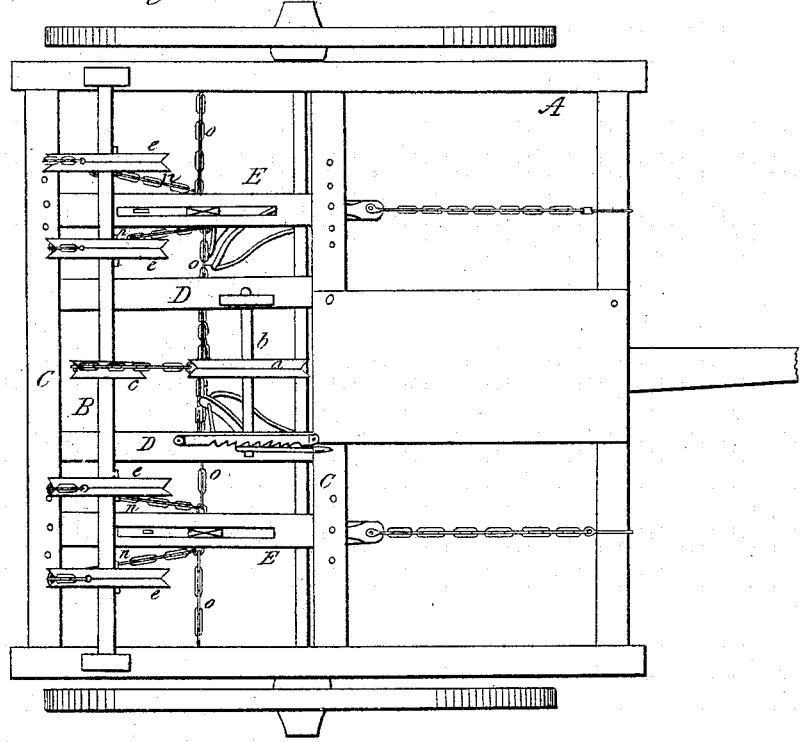
Figure 2:
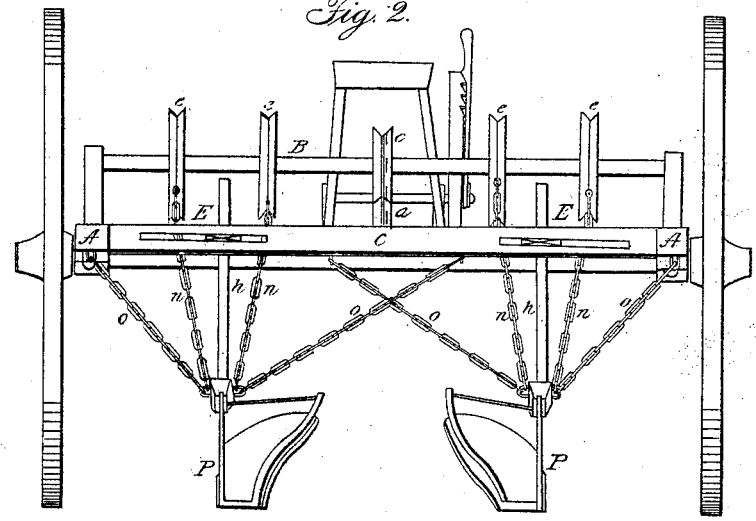

Figure 1 is a plan view; and
Figure 2, a rear elevation of the same.

I construct the main frame A, and mount it on wheels, in the manner described in my patent above referred to. The transverse beams C are slotted longitudinally, to permit the bars E to be adjusted laterally, as desired; and the bars E are also slotted longitudinally, as shown in fig. 1, the same as in my former patent. The hoisting apparatus, consisting of the shaft $b$, with its pulley $a$, and the longer shaft B, with its pulleys $c$ and $e$, are the same, except that in this case I provide two pulleys $e$ and two chains $n$ for each plough or cultivator. In using my device, as formerly constructed, I have found it difficult to keep the ploughs in position and guide them accurately. To remedy these difficulties I now suspend them from the shaft B by means of two chains $n$, one on each side of the standard $h$, each of said chains being somewhat inclined laterally, as shown in fig. 2, so as to assist in bracing and holding the ploughs in position. I then attach to each side of both ploughs P a chain, $o$, which is still more inclined, as shown clearly in fig. 2. These chains $o$ have one end attached to the plough-beam, and the other end to the frame A, and thus prevent the ploughs from moving laterally in either direction, and causing them to run with accuracy. The chains should be attached to the frame A by hooks, so that their length may be varied at will, as may be required to adjust the ploughs to run shallow or deep, as may be necessary in cultivating different crops, or at different stages of the same crop. It will of course be understood that, instead of the plough here shown, other forms of cultivating implements may be substituted, as described in my former patent, they being braced and held by the chains $n$ and $o$ the same as the ploughs above described are held and braced.

Having thus described my invention, what I claim, is—

In combination with the adjustable cultivator frame, I claim the use of the chains $n$ and $o$, when arranged to operate as and for the purpose set forth.

J. W. TYSON.

Witnesses:
W. C. DODGE,
P. T. DODGE.